: 3,504,083
ANTI-PLASMIN MEANS AND METHOD
Van B. Philpot, Jr., P.O. Box 312,
Houston, Miss. 38851
No Drawing. Continuation-in-part of application Ser. No. 318,076, Oct. 22, 1963. This application Mar. 21, 1967, Ser. No. 624,724
Int. Cl. A61k 23/00
U.S. Cl. 424—101     3 Claims

ABSTRACT OF THE DISCLOSURE

A means and method of preventing or inhibiting fibrinolysis caused by materials normally occurring in living organisms is provided by the use of snake serum.

RELATED APPLICATION

This application is a continuation-in-part of U.S. patent application Ser. No. 318,076, filed Oct. 22, 1963 and now abandoned.

BACKGROUND OF THE INVENTION

It is known that in certain medical conditions of man and animals, fibrin and consequently blood clots are formed which sometimes undergo destruction or lysis due to the action of naturally occurring materials. In certain conditions, such as thoracic surgery, abruptio placenta and hemorrhagic diathesis due to other causes, it is desirable to prevent lysis of clots in order to check bleeding tendencies. However, it has been a problem to find a means and method of preventing excessive lysis of clots. This problem will be better understood by considering the mechanisms of clot formation and destruction.

Tissue or platelet descrution in the body causes formation of thromboplastin. The thromboplastin formed is then believed to react with prothrombin in the presence of calcium to yield thrombin which in turn reacts with fibrinogin to yield solid strands of protein material, known as fibrin, which forms the basis of blood clots. It is known that plasmin tends to destroy fibrin, thus causing lysis of clots.

Plasmin is a protein which is normally present in the blood in small quantities in man and animals. Plasminogen is also present in the blood in large quantities and may be activated into plasmin by certain bacteria or extracts of injured tissue. Thus, upon tissue injury, naturally occurring plasmin causes some degree of fibrinolysis and, in certain cases, excessive bleeding.

Attempts have ben made to find a therapeutic agent which would counter the effects of plasmin in the body of man and animals and thereby prolong the life of fibrin-based blood clots. However, such materials, hereinafter referred to as anti-plasmins, have not been available in a form which would allow administration into the body with sufficient potency to prevent or greatly inhibit lysis of fibrin. As early as 1956, it was suggested by Philpot et al. that king snake serum greatly inhibits fibrinolysis caused by plasmin as set forth in 21 Biochemica et Biophysica Acta 524 (1956). It was also known that human serum contains an anti-plasmin which probably plays some small role in inhibiting fibrinolysis. However, this anti-plasmin is normally present in the body in amounts insufficient to prevent substantial fibrinolysis by the action of plasmin. Efforts have been made to isolate or concentrate the anti-plasma occurring in human serum; however, to date, such efforts have proved unsatisfactory. In the case of the anti-plasmin known to exist in king snake serum, it was believed that this anti-plasmin had no value for human or animal therapeutic application since no methods were known for positively separating the anti-plasmin from the toxic serum in which it is contained.

Accordingly, it is an important object of this invention to provide a method of treating snake serum to obtain an anti-plasmin material which is not toxic to living organisms.

It is another object of this invention to provide a method of inhibiting or preventing fibrinolysis due to the action of plasmin on fibrin.

It is a further object of this invention to provide a nontoxic material which contains a highly active anti-plasmin substance.

SUMMARY OF THE INVENTION

It has beeen discovered that fibrinolysis caused by the action of plasmin, can be substantially inhibited or prevented by introducing a specially treated snake serum into an area containing fibrin and plasmin. The snake serum is treated by heating it to form a precipitate. The precipitate is then removed thus detoxifying the serum without destroying anti-plasmin action.

DESCRIPTION OF PREFERRED EMBODIMENTS

Any snake serum may be used as a starting material for the means and methods of this invention. Useful snake serums are obtained from widely varying types of snakes including the Florida rattlesnake (Crotalus adamanteus), water moccasin (Agkistrodon pscivorus), Japanese habu (Elaphe quadrivirgata) and king snake (Lampropeltis getulus). Preferably the serum is obtained by cutting off a portion of the snake's tail and allowing the blood to flow into a sterile container. The serum is separated from the cells by centrifugation. Rattlesnake serum is preferred for use in this invention, since it is most readily available in commercial quantities.

The product of this invention is made by detoxifying the snake serum to remove toxic agents, preferably by heating it in test tubes in a water bath at 56° C. for 30 minutes. Following the heating step, a precipitate is formed which is dispersed in the serum and gives a milky appearance. This precipitate may cause hemolysis in living organisms and is separated and removed from the treated serum preferably by filtering or centrifugation and decantation of the resultant clear supernatant treated serum. The particular temperature at which the serum is heated may vary as may the time of heating so long as toxic materials in the serum are destroyed without destroying the anti-plasmin substance naturally occurring in the serum. Generally, temperatures of from about 45° C. to about 65° C. for from about 5 to about 90 minutes may be used. The time and temperatures vary inversely with each other and in some cases temperatures about 65° C. may be used for shorter time periods and conversely temperatures below 45° C. may be used for longer time periods.

The following nonlimiting examples are included to show the anti-plasmin action of snake serum as compared with human serum and a buffer control.

The following solutions were prepared for use in the illustrative examples in this invention:

Solution A—30 ml. Sorenson's buffer (ph 7.3)+15 ml. fibrinogen=3.33 milligrams/cc. of fibrinogen.

Solution B—5,000 units thrombin+50 ml. Sorenson's buffer (ph 7.3)=100 units per mil clear solution of thrombin.

Solution C—50 cc. Sorenson's buffer+50,000 units plasmin=1,000 units per cc. of plasmin.

Solution C was then mixed in test tubes as follows:

Mixture I—1.5 cc. Sorenson's buffer+0.5 ml. Solution C.

Mixture II—1.5 cc. human serum+0.5 ml. Solution C.

Mixture III—1.5 cc. rattlesnake serum+0.5 ml. Solution C.

Mixture IV—1.5 cc. king snake serum+0.5 ml. Solution C.

The rattlesnake serum was previously prepared by heating at 56° for 30 minutes. A heavy precipitate formed in the serum which was then centrifuged at 1500 r.p.m. for 5 minutes and the clear supernatant serum removed from the precipitate and used.

In the following examples, all solutions used were incubated at 37° C. for the time period indicated in columns 3 and 4. In all cases the ingredients listed in column 2 were mixed together in a test tube and it was found that fibrinogen formed fibrin simulating a clot.

| Col. 1 Example | Col. 2 | Col. 3 (15 min.) Lysis time | Col. 4 (45 min.) Lysis time |
|---|---|---|---|
| 1 | 1.0 cc. solution A +0.1 cc. solution B+0.2 cc. mixture I. | 11′29″ | 13′14″. |
| 2 | 1.0 cc. solution A+0.1 cc. solution B+0.2 cc. mixture II. | 15′41″ | 26′34″. |
| 3 | 1.0 cc. solution A+0.1 cc. solution B+0.2 cc. mixture III. | Clot solid for 24 hrs. | Clot solid for 24 hrs. |
| 4 | 1.0 cc. solution A+0.1 cc. solution B+0.2 cc. mixture IV. | do | Do. |
| 5 | 1.0 cc. solution A+0.1 cc. solution B+0.2 cc. Sorenson's buffer. | do | Do. |

Examples 1 and 2 indicate that the clot or fibrin formation was subject to fibrinolysis in relatively short periods of time. On the other hand, Example 5 shows that the absence of plasmin permitted the clot to remain solid for a period of at least 24 hours. Examples 3 and 4 using rattlesnake and king snake serum respectively, show results comparable to the absence of plasmin. Thus, it is clear that the treated serum used acted as antiplasmin material in that it prevented the breakdown of the clot by the action of plasmin. The heated serum was just as effective as untreated king snake serum showing that heat caused no significant loss of anti-plasmin activity.

In another example of this invention, i.e., Example 6, 1 mil of blood from a heart puncture of each of four normal rabbits was placed in each of four test tubes and incubated at 37° C. Within 1 to 7 minutes, the blood in each test tube coagulated, that is, it changed from liquid to solid form. Within about 1 hour, a clot formed, retracted in each tube and remained solid for 48 hours at which time this part of the experiment was terminated.

Continuing with Example 6, human plasmin (Thrombolysin Merk, Sharpe and Dohme) was dissolved in normal saline in a saturated solution and injected intravenously into each of two rabbits in the dosage indicated in connection with the chart for Example 6 below. A heart puncture was done on each of these rabbits within 10 minutes after injection and 1.0 cc. of blood withdrawn and incubated at 37° C. Clot formation took place within the normal time limits, i.e., 1–7 minutes, but clot retraction did not proceed normally. The clot changed from solid to liquid state (clot lysis) within from 60 to 70 minutes.

In a third aspect of Example 6, a comparable dosage of human plasmin (thrombolysin) as previously decribed, was mixed with saline and heat detoxified at 56° C. for 30 minutes. Rattlesnake serum was then mixed with the plasmin and the mixture inoculated into a rabbit in the amount indicated in the table for Example 6 below. Both coagulation and clot retraction proceeded normally and the clots remained solid for 48 hours at 37° C. as in the normal control first described. It is therefore concluded that the effects of plasmin in the rabbit are neutralized by heat detoxified rattlesnake serum thus paralleling the test tube experiments described in Examples 1–5 using purified fibrinogen and thrombin.

| | Wt. of rabbit (kg.) | Dose thrombolysin (units MSD/ 1 kg.) | Total amount rattlesnake serum (ml.) (detoxified) | Clot lysis time |
|---|---|---|---|---|
| Normal control | 1.2 | | | 48 hrs. (neg.) |
| | 1.5 | | | 48 hrs. (neg.) |
| | 1.5 | | | 48 hrs. (neg.) |
| | 1.7 | | | 48 hrs. (neg.) |
| Thrombolysin plus saline | 1.9 | 6,500 | | 1 hr. 10 min. |
| | 1.5 | 6,500 | | 1 hr. |
| Thrombolysin plus rattlesnake serum | 1.7 | 6,500 | 5.0 | 48 hrs. (neg.). |
| | 1.9 | 6,500 | 5.0 | 48 hrs. (neg.). |

When snake serum is used in accordance with this invention, it is found to have best advantages when used in preferred amount of from 0.5 to 10 mil per kilogram of animal weight. Animals such as rabbits, guinea pigs, mice and the like can be treated in accordance with the present invention.

Since snake serum treated in accordance with this invention is non-toxic to living organisms, it may be injected into the body to prevent clot lysis where desired. For example, in those cases of hemorrhagic diathesis caused by excessive plasmin, small amounts of the treated snake serum of this invention may be injected directly into the blood stream. In surgical cases, it may be desirable to spray or coat an area with the snake serum of this invention to prevent excessive bleeding. Specific amounts of snake serum used in any specific application will vary greatly, depending upon the amount of plasmin to be neutralized and the degree of neutralization required.

What is claimed is:

1. A method of detoxifying snake serum selected from the group consisting of rattlesnake, water mocassin, Japanese habu and king snake sera which normally contain antiplasmin and agents toxic to man or animal body, said method comprises the steps of treating said snake serum by heating said serum from about 45° C. to 65° C. for about 5 to 90 minutes to cause a precipitate of said toxic agents to form and be suspended throughout said serum, separating and removing said precipitate by filtration or centrifugation and decantation without destroying or removing said antiplasmin thereby clarifying said serum and forming a detoxified snake serum.

2. The detoxified snake serum produced by the process of claim 1.

3. A method of preventing clot lysis in a man or animal body comprising injecting the detoxified snake serum of claim 2 into the blood system of said body in an amount of from 0.5 to 10 ml. per kilogram of body weight.

References Cited

Biochemia et Biophysica Acta vol. 21 pp. 524–530 (1956).

Proc. of the Society for Exper. Biol. and Med. vol. 112 (3), pp. 595–598, March (1963).

Biological Abstracts, vol. 29, No. 9, p. 2178 (1955).

The New England Journal of Medicine, March 1959, 545–548.

Scientific American, vol. 84, pp. 18–21, March 1951.

ALBERT T. MEYERS, Primary Examiner

FREDERICK E. WADDELL, Assistant Examiner

U.S. Cl. X.R.

424—98